United States Patent [19]

Vives

[11] Patent Number: 4,547,313
[45] Date of Patent: Oct. 15, 1985

[54] CONDUCTIVE POLYMER COMPOSITION

[75] Inventor: Van C. Vives, Bartlesville, Okla.

[73] Assignee: Phillips Petroleum Company, Bartlesville, Okla.

[21] Appl. No.: 485,806

[22] Filed: Apr. 18, 1983

[51] Int. Cl.$^4$ .............................................. H01B 1/06
[52] U.S. Cl. ..................... 252/518; 524/157; 524/166; 525/537; 528/487
[58] Field of Search ................ 252/500, 518; 525/537; 524/603, 609, 157, 166; 528/487, 490, 491

[56] References Cited

U.S. PATENT DOCUMENTS

| | | | |
|---|---|---|---|
| 3,988,286 | 10/1976 | Edmonds et al. | 525/537 |
| 4,021,596 | 5/1977 | Bailey | 525/537 |
| 4,222,903 | 9/1980 | Heeger et al. | 252/518 |
| 4,269,738 | 5/1981 | Pez et al. | 252/500 |
| 4,293,452 | 10/1981 | Fox et al. | 252/518 |
| 4,360,644 | 11/1982 | Naarman et al. | 252/500 |
| 4,363,829 | 12/1982 | Seshimoto et al. | 252/500 |
| 4,375,427 | 3/1983 | Miller et al. | 252/512 |
| 4,462,929 | 7/1984 | Frommer et al. | 252/518 |
| 4,487,709 | 12/1984 | Kobayashi et al. | 252/500 |

OTHER PUBLICATIONS

C & EN, Mar. 31 (1980), p. 36.
J. Chem. Soc. Chem. Comm., pp. 578–580 (1977).
J.A.C.S. 100, 1013–1015 (1978).

*Primary Examiner*—Josephine L. Barr
*Attorney, Agent, or Firm*—French & Doescher

[57] ABSTRACT

Electrical conductivity of a polymeric material is increased by the addition of a compound represented by the formula $$[CF_3-(R)_{0-2}-SO_3]_x M$$

wherein M is a metal selected from Groups IB, IIB and VIII of the Periodic Table, x is the valence of M, and each R, if present, is selected independently from $CH_2$ and $CF_2$. Examples of M include zinc, cadmium, mercury, copper, nickel and silver. The presently preferred material, for availability and effectiveness, is zinc trifluoromethanesulfonate, in which M is zinc and there are no R groups present.

19 Claims, No Drawings

CONDUCTIVE POLYMER COMPOSITION

This invention relates to electrically conductive polymers. It further relates to a method for preparing an electrically conductive poly(arylene sulfide) film.

Commercial use for electrically-conductive polymers and polymer compounds are increasing. Compositions having moderate conductivity ($10^{-12}$ to $10^{-8}$ ohm$^{-1}$ cm$^{-1}$) are used where electrostatic discharge is important, such as in the computer and electronics industry. Semiconductive polymers ($10^{-7}$ to $10^{0}$ ohm$^{-}$cm$^{-1}$) are being developed for use in p-n junction devices, such as solar cells.

It is known that some thermoplastic polymers can be made electrically conductive by doping with a chemical agent. For example, electrical conductivity can be imparted to poly(phenylene sulfide) by doping the polymer with arsenic pentafluoride. Toxicity and stability would be considerations in the development of such a material, but the experiment suggests the potential for making this commercially-important material electrically conductive.

It is therefore an object of the invention to provide an electrically-conductive polymer. It is a further object to provide an article of manufacture containing an electrically conductive polymer. In a specific embodiment, it is an object of the invention to provide semiconductive or conductive poly(arylene sulfide).

BRIEF DESCRIPTION OF THE INVENTION

According to the invention, conductivity of a polymeric material is increased by the addition of a compound represented by the formula:

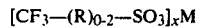

In one embodiment, a poly(arylene sulfide) is made more electrically conductive by the addition of zinc trifluoromethanesulfonate.

DETAILED DESCRIPTION OF THE INVENTION

Any polymeric material which is capable of electrical conductivity with the addition of a doping agent is suitable for the invention composition and method. Such polymeric materials include thermoplastics such as polyethylene, polypropylene and copolymers incorporating these. Other, highly suitable polymers include poly(arylene sulfide)s and polysulfones. In general, such polymers include aromatic moieties having sulfide (—S—), ketone (CO) and/or sulfone (SO$_2$) linkages. Examples of such polymers include poly(phenylene sulfide), which can be prepared by the methods of U.S. Pat. Nos. 3,354,129 and 3,919,177, poly(arylene sulfide/sulfone), which can be produced by reacting sodium sulfide and bis(p-chlorophenyl)sulfone, and poly(benzophenone sulfide) prepared by reacting dichlorobenzophenone and sodium sulfide as described in Chemical Abstracts, Vol. 97, 216826Z.

The salt which is added to the polymeric material for imparting electrical conductivity can be represented by the formula

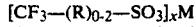

wherein M is a metal selected from Groups 1B, 11B and VIII of the Periodic Table, x is the valence of M, and each R, if present, is selected independently from CH$_2$ and CF$_2$. Examples of M include zinc, cadmium, mercury, copper, nickel and silver. The presently preferred material, for availability and effectiveness, is zinc trifluoromethanesulfonate, in which M is zinc and there are no R groups present.

Any method of incorporating the salt into the polymeric material is suitable as long as good dispersion is obtained. It is suitable, for example, to intimately mix by dry grinding the polymer in solid form with the salt in pure, solid form. The resulting mixture can then be molded by extrusion or compression means into electrically conductive objects, often in the form of film or thin sheet.

Poly(phenylene sulfide) film produced from compression molding is tan and opaque. Thermal analysis data suggest that the film is not crystallized to any significant extent. Representative thermal properties of a test sample included Tg=87C, Tc=126C, and Tm=275C.

The salt is incorporated into the polymer in an amount effective for increasing the electrical conductivity of the polymer. The amount will vary depending upon the particular polymer and salt used and the electrical conductivity desired. Levels of the salt of at least about 3 weight percent, preferably at least about 6 weight percent, are suitable. In general, the salt will make up from about 3 weight percent to about 12 weight percent, preferably about 6 weight percent to about 10 weight percent of the polymer and salt mixture.

It has been found that the purity of the chemical agent affects the level of imparted conductivity. It is therefore desirable to obtain the salt from a source which provides consistently pure reagents.

A molded article obtained from the polymer-salt mixture can be used for a variety of commercial purposes. Polymers having moderate conductivity ($10^{-12}$ to $10^{-8}$ ohm$^{-1}$ cm$^{-1}$) can be used in p-n junction devices, such as solar cells.

EXAMPLE I

A typical procedure is described for preparing films and evaluating additives. A mixture of 97 parts by weight poly(phenylene sulfide), the sample of which was an uncured PPS from Phillips Petroleum Company having a melt flow 20–65 g/10 min at 316° C. at 5 Kg load according to modified ASTM D-1238, and 3 parts by weight zinc trifluoromethanesulfonate (Alpha Products) were intimately mixed by grinding in a mortar and pestle. The resulting powdered mixture was then dried in a vacuum oven at 110° C. overnight. The dried powder was evenly spread into a thin 4 inch×4 inch picture frame mold and compression molded between two pieces of aluminum foil at 315° C. for 6 to 10 minutes at 35,000 psi ram force. The frame, foil and contents were removed hot and allowed to cool slowly to room temperature to give a transparent or opaque film 4 inches×4 inches×0.063 centimeters. Film samples were tested for conductivity by placing a 0.5 inch wide strip of film lengthwise across two strip terminals 0.5 inch apart and connecting them to a 45-volt cell battery. The current across the film sample was determined with a Keithley Electrometer, Model 610C. The voltage was also determined. From the measurements obtained, conductivity was calculated using the formulas $$\sigma_V = \frac{1}{\rho_s \cdot t}$$

where $\sigma_V$ = conductance in ohms$^{-1}$ cm$^{-1}$
$\rho_s$ = surface resistivity in ohms/square
t = film thickness, cm., and $$\rho_s = R \cdot W / l$$

where $$R = \frac{\text{measured voltage}}{\text{measured amperage}}$$

W = film width in cm.
l = film length in cm.

Based on the described procedure, the effect of zinc trifluoromethanesulfonate on the conductance of PPS film was determined. These results are listed in TABLE I where it can be shown that good conductance is obtained when about 6 to 10 weight percent of the zinc salt is present. The results show that at 10 weight percent (10 parts zinc salt, 90 parts PPS) the zinc salt provides more PPS conductance than the corresponding silver salt (Run 3) or zinc powder (Run 2). Compositions having $10^7$ to $10^0$ ohm$^{-1}$ cm$^{-1}$ conductivity were considered semiconductive and useful in areas such as solar cells. The data also show that purity of the zinc trifluoromethanesulfonate additive to be important because film conductivities varied with different shipmens or lots (compare runs 5 to 7).

TABLE I

Effect of Zinc Trifluoromethanesulfonate on the Conductivity of PPS[a]

| Additive | Conductivity, ohm$^{-1}$ cm$^{-1}$ |
|---|---|
| 1. no additive | $5.9 \times 10^{-12}$ |
| 2. 10 wt. % zinc powder[b,f] | $1.1 \times 10^{-12}$ |
| 3. 10 wt. % silver trifluoromethanesulfonate[c] | $1.2 \times 10^{-10}$ |
| 4. 3 wt. % zinc trifluoromethanesulfonate[c] | $3.5 \times 10^{-11}$ |
| 5. 6 wt. % zinc trifluoromethanesulfonate[c] | $1.8 \times 10^{-7}$ |
| 6. 6 wt. % zinc trifluoromethanesulfonate[d] | $4.7 \times 10^{-11}$ |
| 7. 8 wt. % zinc trifluoromethanesulfonate[e] | $3.9 \times 10^{-11}$ |
| 8. 10 wt. % zinc trifluoromethanesulfonate[e] | $2 \times 10^{-7}$ |

[a]Poly(phenylene sulfide), Phillips Petroleum Co.
[b]Zinc dust from Mallinckrodt Chemical Co.
[c]Available from Alpha Products.
[d]A mixture of zinc salt from two lots.
[e]Zinc salt from a second lot.
[f]Dry blended with PPS, extruded at 316° C., ground in Wiley mill and compression molded to film.

I claim:

1. A composition comprising a poly(arylene sulfide) and from about 3 weight percent to about 12 weight percent, based on the weight of the composition, of a solid represented by the formula $$[CF_3-(R)_{0-2}-SO_3]_xM$$

wherein M is selected from the metals of Groups IB, IIB and VIII of the Periodic Table, x is the valence of M and R is selected from $CH_2$ and $CF_2$.

2. The composition of claim 1 in which M is a metal of Group IIB.

3. The composition of claim 2 in which M is zinc.

4. The composition of claim 3 in which the poly(arylene sulfide) comprises poly(phenylene sulfide).

5. The composition of claim 4 in which the poly(arylene sulfide) comprises at least two aromatic moieties joined by sulfide linkages.

6. A composition comprising a poly(arylene sulfide) and an amount of a solid represented by the formula $$[CF_3-(R)_{0-2}-SO_3]_xM$$

effective for increasing the electrical conductivity of the poly(arylene sulfide), wherein M is selected from the metals of Groups IB, IIB and VIII of the Periodic Table, x is the valence of M and R is selected from $CH_2$ and $CF_2$.

7. The composition of claim 6 in which M is zinc.

8. The composition of claim 6 in which the poly(arylene sulfide) comprises poly(phenylene sulfide).

9. The composition of claim 7 in which the zinc compound is present in an amount of at least about 3 weight percent, based on the weight of the composition.

10. The composition of claim 9 in which the zinc compound is present in an amount of about 6 weight percent to about 12 weight percent.

11. A method for increasing the conductivity of a poly(arylene sulfide) comprising dispersing in the poly(arylene sulfide) an amount of a solid represented by the formula $$[CF_3-(R)_{0-2}-SO_3]_xM$$

effective for increasing the electrical conductivity of the poly(arylene sulfide), wherein M is selected from metals of Groups IB, IIB and VIII of the Periodic Table, x is the valence of M, and each R is selected independently from $CH_2$ and $CF_2$.

12. The method of claim 11 in which M is zinc.

13. The method of claim 11 in which the dispersed compound is present in an amount of at least about 3 weight percent, based on the weight of the dispersed compound and the polymeric material.

14. A film having an electrical conductivity of at least about $10^{-7}$ ohm$^{-1}$ cm$^{-1}$ produced from the composition of claim 1.

15. The composition of claim 10 in which the zinc compound is zinc trifluoromethanesulfonate.

16. The composition of claim 8 in which the zinc compound is zinc trifluoromethanesulfonate.

17. The method of claim 11 in which the solid represented by the formula $[CF_3-(R)_{0-2}-SO_3]_xM$ is dispersed in the poly(arylene sulfide) by grinding into an intimate mixture.

18. The composition of claim 1 which is a solid powdered mixture.

19. A film produced from the composition of claim 6.

* * * * *